May 29, 1951 F. E. MOFFETT ET AL 2,555,094
JOURNAL BOX

Filed Nov. 2, 1946 2 Sheets-Sheet 1

Fig:1.

INVENTORS
FRANK E. MOFFETT
BY HUBERT L. SPENCE
Clarence Kerr
ATTORNEY

May 29, 1951 — F. E. MOFFETT ET AL — 2,555,094
JOURNAL BOX
Filed Nov. 2, 1946 — 2 Sheets-Sheet 2

INVENTORS
FRANK E. MOFFETT
BY HUBERT L. SPENCE
ATTORNEY

Patented May 29, 1951

2,555,094

UNITED STATES PATENT OFFICE 2,555,094

JOURNAL BOX

Frank E. Moffett, Maywood, Ill., and Hubert L. Spence, East Cleveland, Ohio, assignors to National Malleable and Steel Castings Company, Cleveland, Ohio, a corporation of Ohio Application November 2, 1946, Serial No. 707,358

3 Claims. (Cl. 308—45)

The invention relates to journal boxes for railway cars, and to wind deflectors for the lids of such boxes.

Journal boxes are usually made with hinged lids arranged to bear against a flat machined surface around the periphery of the journal box opening. The lids have flanges around their edges extending inwardly around the top and sides of the journal box opening at the outside of the box and adjacent said flat machined surface. In order to seal the opening effectively against the entry of moisture, dust and other foreign matter, it is desirable to provide wind deflection strips at the sides of the box overlapping the flanges of the lid and forming a groove therefor between the sides of the box and the deflection strips. It has proved to be quite essential that such wind deflection strips shall extend approximately flush with the outside of the lid. This means that they will project beyond the plane of the box opening, i. e. beyond the flat machined lid-engaging surface. This makes it difficult to machine the aforesaid lid-engaging surface unless the deflection strips be formed separately from the box. Assuming that the deflection strips are formed separately from the box and secured to its sides, it is necessary to maintain a fairly close tolerance on the outside dimensions of the box in order to insure proper fitting of the lid with its flanges extending between the sides of the box and the deflection strips, the spacing of the latter being affected by any variation in the size of the box.

The primary object of our invention has been to overcome the machining difficulties encountered with boxes having integral deflection strips while also eliminating the necessity for maintaining close tolerances on the box dimensions even with the deflection strips formed separately from the box.

Another object has been to provide a construction which greatly facilitates the welding of deflection strips to cast journal boxes.

In accordance with our invention, ribs are formed on the outer surfaces of the sides of the box in spaced relationship to the flat-lid engaging surface surrounding the box opening. These ribs are formed when the box is cast. The lid-engaging surface is machined, as are also the tops of the ribs, and the wind deflection strips are then welded or otherwise secured to the tops of the ribs in a position to project beyond the flat machined lid-engaging surface. This solves the problems of both the integral and separately-formed deflection strip constructions, for machining of the lid-engaging surface of the box is easily performed on an ordinary grinder or milling machine while the necessity for maintaining close tolerances on the box dimensions is eliminated by machining the ribs on which the deflection strips are mounted.

In the drawings, Fig. 1 is a side elevational view of a journal box embodying our invention in its preferred form.

Figure 1:
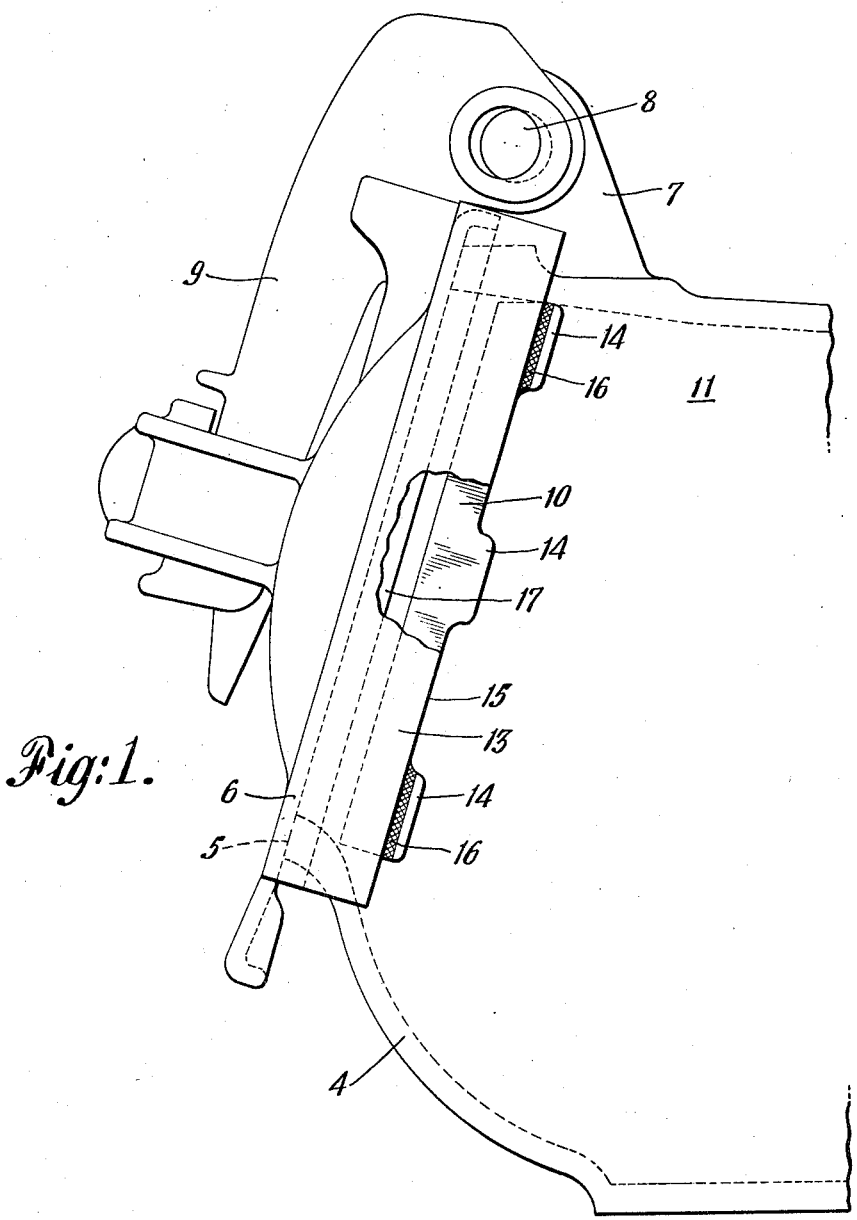
Figure 2:
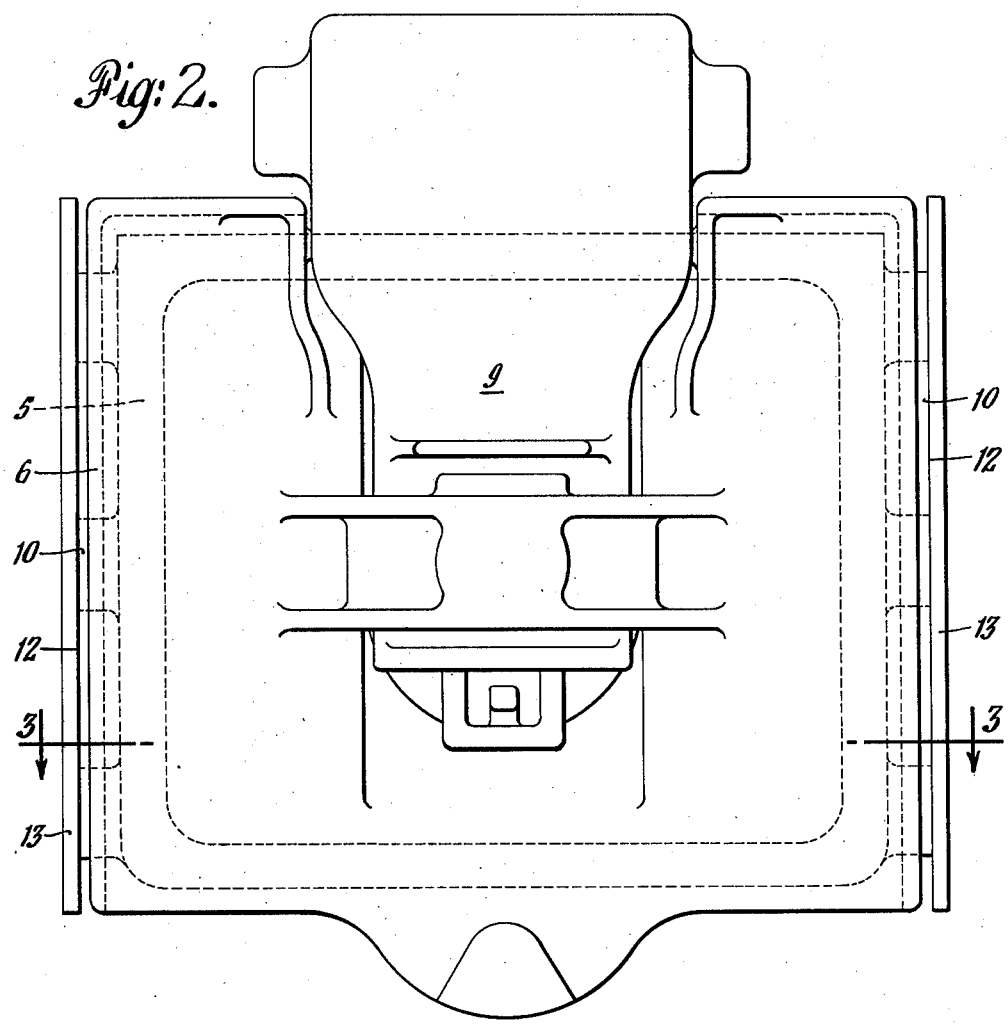
Fig. 2 is a front elevational view of the same journal box.

Our invention is advantageously employed in conjunction with a journal box 4 having an opening with a flat machined lid-engaging surface 5. For completeness of illustration we have shown a journal box lid 6, hingedly connected to a lug 7 at the top of the box, as by means of the pin 8, and having means such as an arm 9 cooperating with spring and lever mechanism for holding the lid 6 tightly against the flat machined surface 5 of the journal box opening when closed, and for supporting the lid in open position for inspection and maintenance when desired. The lid shown is one of the type known to the art as "center bearing," i. e., when closed, the lid is spring-pressed centrally thereof so as to distribute the closing pressure around all four sides of the journal box opening. However, the present invention is not concerned with the construction of the journal box lid, nor with its associated operating mechanism, and as such constructions are well known in the railway equipment art, a more detailed description is not needed here. Moreover, lids of suitable conventional design may be used in conjunction with our improved journal box construction, and they need not conform to the design we have chosen for illustration.

Figure 3:
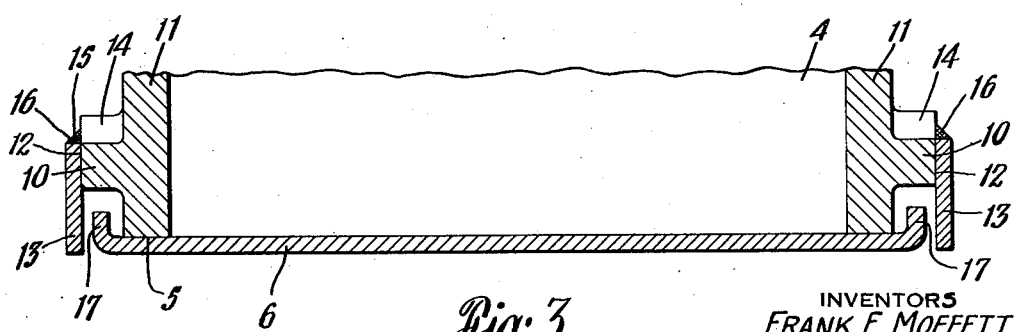
Fig. 3 is a detail sectional view taken as indicated at 3—3 in Fig. 2.

In accordance with our invention, ribs 10 are formed on the outer surfaces of the sides 11 of the journal box in spaced relationship to the flat machined lid-engaging surface 5 (Fig. 3). The tops or outer surfaces 12 of these ribs are flat machined to control the spacing of the wind deflection strips and keep within the tolerance necessary to be maintained for proper clearance between the deflection strips and the sides of the lid.

The deflection strips, shown at 13, are secured to the machined surfaces of ribs 10, as by welding, and project beyond the flat machined lid-engaging surface 5 of the journal box, as clearly shown in Fig. 3 of the drawings, i. e. beyond the plane of the box opening.

In our preferred construction, the ribs 10 formed on the outer surfaces of the sides of the box have lugs 14 projecting beyond the inner edges 15 of the deflection strips 13 to facilitate welding of the latter to the ribs. In assembling the deflection strips 13 with the box, their inner edges 15 preferably are brought into alignment with the sides of ribs 10. This leaves the lugs 14 projecting beyond the edges 15 of the deflection strips as aforesaid, and welds are made as indicated at 16. Following this procedure, proper alignment between the lid 6 and the outer edges of the deflection strips 13 will be secured, with these outer edges projecting beyond the plane of the journal box opening and extending substantially flush with the outer surface of the lid. The side flanges 17 of the lid extend between the sides of the box and the deflection strips. The spacing of the deflection strips, however, is unaffected by any variation in the width of the journal box, being governed solely by the spacing of the finished surfaces 12 of the ribs 10.

The terms and expressions which we have employed are used in a descriptive and not a limiting sense, and we have no intention of excluding such equivalents of the invention described, or of portions thereof, as fall within the purview of the claims.

We claim:

1. In a journal box having an opening with a flat lid-engaging surface, ribs formed on the outer surfaces of the opposite sides of the box in spaced relationship to said flat lid-engaging surface, the distance between the outer surfaces of the ribs on the opposite sides of the box as measured across the width of the box being adjusted to a fixed distance by means of machining, and wind deflection strips secured to said ribs, said wind deflection strips in conjunction with the sides of said box forming channels for receiving the side flanges of a journal box lid.

2. The journal box construction according to claim 1 in which the ribs formed on the outer surfaces of the sides of the box have lugs projecting beyond the edges of the wind deflection strips and welded thereto.

3. In a journal box having an opening with a plane lid engaging surface, ribs extending outwardly from the opposite sides of said box adjacent said opening, said ribs having plane surfaces at least one of which is machined to predetermine the distance between the plane surfaces of said ribs, as measured across the width of the box, and deflection strips secured to said surfaces on said ribs and adapted to overlap the sides of a journal box lid.

FRANK E. MOFFETT.
HUBERT L. SPENCE.

REFERENCES CITED

The following references are of record in the file of this patent:

UNITED STATES PATENTS

| Number | Name | Date |
|---|---|---|
| 2,206,498 | Couch | May 5, 1936 |
| 2,039,357 | Smith | July 2, 1940 |